March 30, 1954 L. W. T. CUMMINGS ET AL 2,673,764
CONTACT MATERIAL ELEVATING CONDUIT
Filed Oct. 24, 1951

INVENTORS.
LELAND W.T. CUMMINGS
HANS G. SHIMP
BY
Busser and Smith
ATTORNEYS

Patented Mar. 30, 1954

2,673,764

UNITED STATES PATENT OFFICE 2,673,764

CONTACT MATERIAL ELEVATING CONDUIT

Leland W. T. Cummings, Wyncote, and Hans G. Shimp, Springfield, Pa., assignors to Sun Oil Company, Philadelphia, Pa., a corporation of New Jersey Application October 24, 1951, Serial No. 252,929

2 Claims. (Cl. 302—17)

This invention relates to apparatus for pneumatically moving granular or pelleted contact material or catalyst from a lower receptacle in a continuous stream upwardly into and through one or more elongate conduits to an upper receptacle.

It is well known in the art of catalysis, such as the cracking of heavier petroleum fractions to gasoline and other hydrocarbon processing operations, to use a catalyst or contact material in a continuous system. In such continuous systems a conversion zone is operated simultaneously with a second zone which is in regeneration. Commercial moving or continuous catalyst systems may usefully have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regenerating zone to the upper conversion zone two well known means applicable to the transportation of granular solids from one locus to another have been used, namely: by mechanical conveyors and by pneumatic conveyors, in the latter of which air, steam or flue gas produced at the refinery is readily available as the pneumatic lifting medium.

It is generally necessary in systems employing conversion and regeneration zones in superposed relationship to convey the catalyst or contact material through a conduit several hundred feet in length in order to return it from the lower reaction zone to the upper reaction zone. From the lower reaction zone the material is delivered by gravity to a receptacle positioned at a level below that of the lower zone, from which receptacle it is necessary to effect or begin the lifting or upward conveying operation. In a pneumatic lifting system this lowermost receptacle is generally known in the art as an engager since the material is engaged therein by the lifting flue gas or air to effect the lifting operation. The lower end of the air lift conduit extends into or is in communication with the engager receptacle while the upper end of the lift conduit communicates with an upper receptacle positioned at a level above the top of the upper reaction zone or chamber. The upper receptacle is designed so that the lifting medium is separated from the catalyst or contact material and is generally known as the disengager.

In the pneumatic transportation of pelleted or finally divided catalyst or contact material one of the principal zones of attrition is within the transporting or elevating conduit. The present invention is directed to a particular form of elevating conduit which is designed to maintain such attrition at a minimum.

It has been found that with cylindrical conduits, the rate of attrition for a given height of conduit and at constant catalyst velocity and other conditions increases as the diameter of the conduit increases. In cylindrical conduits the velocity of the transporting medium is less along the inner wall of the conduit, and, in a large diameter conduit, some of the larger particles fall downwardly along the wall until they are again picked up by the elevating fluid and carried upwardly and generally centrally of the conduit to the disengager. This action results in high rates of attrition in large diameter cylindrical conduits. When small diameter conduits are used, on the other hand, the region of low gas velocity adjacent the conduit wall is small enough that the large particles do not penetrate thereinto and fall downwardly therein; thus small conduits provide much more even flow upwardly through the conduits and consequently lower attrition. However, small diameter lift conduits have the disadvantage of relatively low solids flow rate capacity.

The present invention provides a manner in which high solids flow rates are obtained while also obtaining the advantageous flow characteristics of a small diameter lift conduit. According to the present invention, there is provided apparatus for elevating granular contact material including an engaging vessel and means for supplying contact material and lifting gas thereto, a disengaging vessel, and a lift conduit extending upwardly from the engaging vessel to the disengaging vessel, the lift conduit having a substantially symmetrical horizontal cross section which has a long axis at least three times as long as its short axis. The long axis is preferably not more than fifteen times as long as the short axis. The short axis is preferably 2 to 8 inches in length, in order that the desirable flow characteristics associated with the use of cylindrical conduits having 2 to 8 inches diameter are obtained while also obtaining greater solids capacity than that of such individual cylindrical conduits.

Suitable cross sectional shapes for lift conduits according to the invention include elliptical and rectangular cross section and other elongated cross sections, as well as the cross section illustrated in attached Figure 3, wherein two semicircles, having their open portions directly facing each other, are connected by parallel lines each tangent to both semicircles. Preferably, the cross section has smoothly curved contour at the extremities of the long axis.

Lift conduits employed according to the present invention suitably have elongated cross section, with long axis at least three times as long as short axis, throughout the entire extent of the lift conduit between engager and disengager; otherwise the combined advantages of high solids capacity and uniform lifting gas velocity across the lift conduit cross section are not obtained.

A complete understanding of the present invention may be had by reference to the following description taken in connection with the accompanying drawings which form a part of the application in which.

Figure 1:
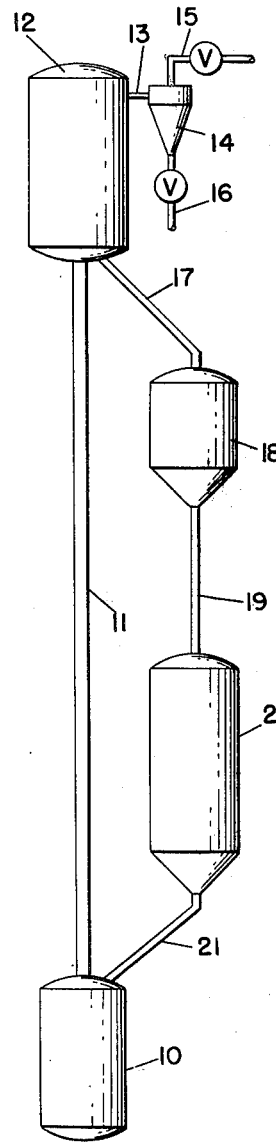
Figure 1 is an elevational view for schematically showing a typical catalytic cracking system employing a pneumatic lift for elevating pelleted catalyst or contact material.

Referring to Figure 1 of the drawing, which shows diagrammatically the conventional elements of a continuous system, a lower receptacle or chamber 10 functions as a catalyst engaging zone, that is, a zone wherein the catalyst is engaged by the air, flue gas or steam supplied thereto by suitable means. The lift pipe or elevating conduit which is indicated at 11 has horizontal cross-section which is elongated as subsequently described in connection with Figure 3, and has its lower end in communication with the chamber 10 and its upper end in communication with in upper chamber 12 which is the disengaging chamber or zone wherein the material is disengaged from the air or other elevating medium. The lifting medium is discharged from the upper chamber 12 through a conduit 13 and is passed to any conventional separating means such as a cyclone separator 14 having an upper conduit 15 in communication therewith to remove the lifting medium and a lower conduit 16 for removing any fines which become entrained in the lifting medium.

The catalyst which remains in the disengager 12 is returned through conduit 17 by gravity to an upper reaction chamber 18 wherein usually an on-stream reaction is effected to obtain the desired product and continues to flow therefrom through conduit 19 by gravity into a lower reaction chamber 20 wherein the catalyst or contact material is regenerated to remove any deposits which might have been formed on the catalyst in the upper chamber 18. From the lower chamber 20 the catalyst or contact material continues to flow by gravity through conduit 21 and is returned to the engaging chamber 10. The conduits 17, 19, and 21 through which the catalyst or contact material flows in returning from the disengager 12 to the engager 10 are usually provided with means for supplying steam or other gaseous purging medium thereto in order to prevent reaction products formed in chamber 18 and regeneration fumes formed in chamber 20 from communicating with the other chambers or conduits in the system.

Figure 2:
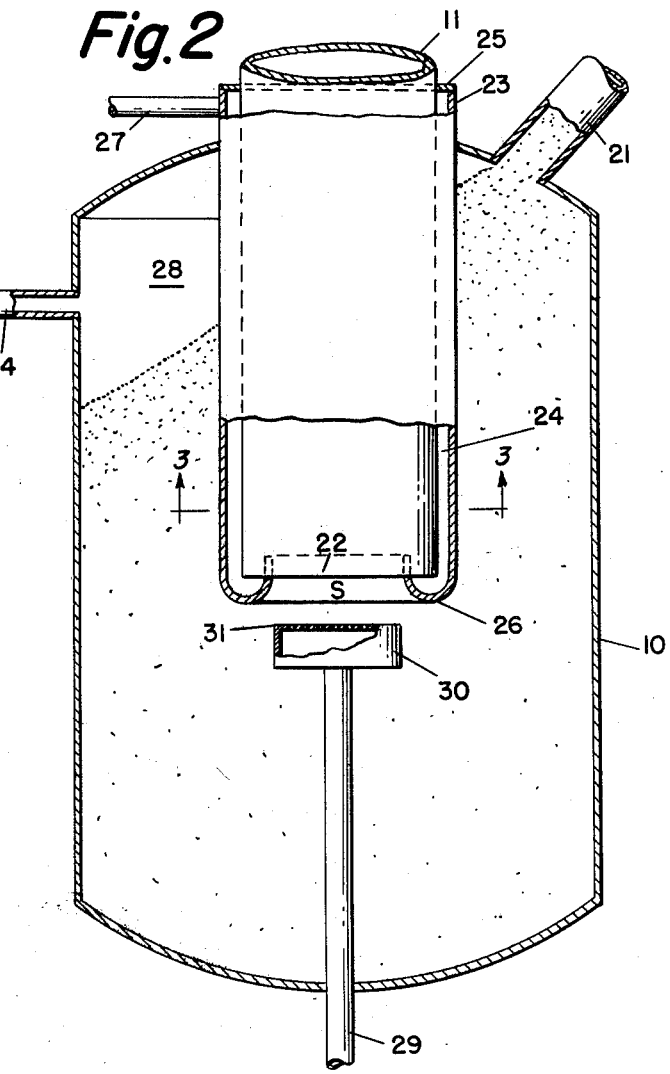
Figure 2 is an enlarged view in sectional elevation showing the invention as applied to the engager portion of the system.

Referring to Figure 2, the engager 10 receives contact material through line 21 from the regeneration zone 20, as explained in connection with Figure 1, and the contact material acquires an angle of repose generally indicated by the dotted line.

A conduit 23 is positioned about the lower end of elevating conduit 11 providing an annular space 24 therewith. The space is closed at its upper end by a ring 25 and is open at its lower end portion which terminates in an inwardly and upwardly extending flange 26. Lifting fluid is supplied through conduit 27 to space 24 and is directed upwardly to assist in elevating the contact material through the conduit 11. Other air can be supplied directly to the space 28 above the body of contact material to exert pressure on the body of material and urge it toward the lower end 22 of the elevating conduit and additionally other lifting fluid may be supplied by conduit 29 positioned directly below the lower end 22 of the elevating conduit and terminating at its upper end in a diffuser 30 which is in the form of a closed chamber having its top 31 perforated to prevent the catalyst from entering into the conduit 29 but permitting the lifting or elevating fluid to diffuse through the contact material existing in zone S at the lower end 22 of conduit 11. The particular arrangements for supplying the elevating or lifting fluid to the body of contact material are disclosed only as being illustrative of means associated with the engager end of the system for directing the contact material into the elevating conduit 11 and elevating it therethrough to the disengager 12.

Figure 3:
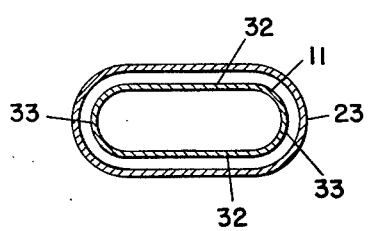
Figure 3 is a view taken on the line 3—3 of Figure 2.

Referring to Figure 3, it is seen that lift conduit 11 is composed of two half-pipes 33 having their open portions directly facing each other, and two parallel sidewalls 32 secured to the half-pipes 33 and providing therewith an enclosed space for travel of granular solids. The length of the long axis of the cross section of lift conduit, i. e. the distance between the outermost portions of the two half-pipes 33, is about three times the length of the short axis, i. e. the perpendicular distance between the two sidewalls 32.

In operation, granular solids enter engager 10 through line 21. Lifting gas is introduced into engager 28 through line 34 and forces the solids downwardly in engager 11 and around the flange 26 into and through the zone S. Diffusing gas is introduced through line 29 and through the space provided by plate 31 and by conduit section 30 into the mass of solids in engager 10. Additional lifting gas is introduced through line 27 into the annular space 24 and thence into lift conduit 11 where it comes in contact with solids rising from zone S above the lift conduit inlet 22. The additional lifting gas then assists in propelling the solids upwardly through lift conduit 11 into disengager 12.

By virtue of the nature of the cross sectional shape of lift conduit 11, the solid particle velocity distribution across the lift conduit cross section has a beneficially high uniformity, and is substantially more uniform than that obtained at the same flow rate in a cylindrical lift conduit having cross sectional area equal to that of the lift conduit 11. Thus, the uniform flow and velocity distribution characteristics associated with the use of a small cylindrical lift conduit, e. g. one having diameter equal to the perpendicular distance between sidewall 32, are obtained according to the present invention, thus providing low attrition rates with large throughput capacity.

The invention claimed is:

1. Apparatus for elevating contact material from a lower vessel to an upper vessel which comprises an elevating conduit having its upper end in communication with the upper vessel and its lower end portion extending through the upper end of the lower vessel to have its lower inlet end positioned therewithin, said conduit in horizontal cross-section having a short axis and a long axis at least three times as great as the short axis, a sleeve about the lower end portion of the conduit providing a fluid space therewith, said sleeve having a closed upper end and an open lower end, said lower end being upturned and positioned within the inlet end of the elevating conduit, means adjacent the upper end of the lower vessel for supplying contact material thereto in a manner to maintain a body of the material therein above the inlet end of the conduit, means for supplying fluid to the body of material in a zone below the inlet end of the elevating conduit and means for supplying other fluid to said fluid space for passage directly into the elevating conduit.

2. Apparatus as in claim 1 further characterized by the length of the short axis being within the approximate range of two to eight inches.

LELAND W. T. CUMMINGS.
HANS G. SHIMP.

References Cited in the file of this patent

UNITED STATES PATENTS

| Number | Name | Date |
|---|---|---|
| 1,416,013 | Gieseler | May 16, 1922 |
| 2,561,771 | Ardern | July 24, 1951 |

FOREIGN PATENTS

| Number | Country | Date |
|---|---|---|
| 27,811 | Great Britain | Dec. 17, 1907 |